United States Patent
Mizuno et al.

(10) Patent No.: US 9,115,764 B2
(45) Date of Patent: Aug. 25, 2015

(54) DOUBLE-ROLLER-TYPE TRIPOD CONSTANT-VELOCITY JOINT

(71) Applicant: JTEKT Corporation, Osaka-shi (JP)

(72) Inventors: Koichiro Mizuno, Kashiwara (JP); Keishi Kobata, Anjo (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/169,372

(22) Filed: Jan. 31, 2014

(65) Prior Publication Data
US 2014/0221107 A1 Aug. 7, 2014

(30) Foreign Application Priority Data

Feb. 5, 2013 (JP) .................................. 2013-020623

(51) Int. Cl.
*F16D 3/205* (2006.01)
*F16D 3/24* (2006.01)

(52) U.S. Cl.
CPC ................. *F16D 3/24* (2013.01); *F16D 3/2055* (2013.01)

(58) Field of Classification Search
CPC ................................. F16D 3/2025; F16D 3/24
USPC .......... 464/111, 123, 124, 132, 905; 384/245, 384/296; 403/11, 14, 135
See application file for complete search history.

(56) References Cited

U.S. PATENT DOCUMENTS

| 5,167,583 A * | 12/1992 | Bensinger et al. ............ 464/111 |
| 5,591,085 A | 1/1997 | Stall et al. |
| 6,572,481 B1 * | 6/2003 | Margerie ...................... 464/111 |

FOREIGN PATENT DOCUMENTS

| JP | 7-151158 | 6/1995 |
| JP | 2008-208858 | 9/2008 |

* cited by examiner

*Primary Examiner* — Gregory Binda
(74) *Attorney, Agent, or Firm* — Oblon, McClelland, Maier & Neustadt, L.L.P.

(57) ABSTRACT

One end face of an outer roller is provided with an annular rib that protrudes radially inward and that retains an inner roller and rolling elements. The other end face-side portion of the outer roller is provided with an inner component retaining portion that retains the inner roller and the rolling elements. In a roller unit in which the inner roller and the rolling elements are retained in the outer roller by the rib and the inner component retaining portion, an inner peripheral face of the inner roller through which a tripod shaft portion is passed is provided with a tripod shaft portion insertion restricting portion that allows the tripod shaft portion to be passed through the inner roller only from an end face side of the roller unit, on which the rib of the outer roller is not provided.

1 Claim, 7 Drawing Sheets

DOUBLE-ROLLER-TYPE TRIPOD CONSTANT-VELOCITY JOINT

INCORPORATION BY REFERENCE

The disclosure of Japanese Patent Application No. 2013-020623 filed on Feb. 5, 2013 including the specification, drawings and abstract, is incorporated herein by reference in its entirety.

BACKGROUND OF THE INVENTION

1. Field of the Invention

The invention relates to a double-roller-type tripod constant-velocity joint used in, for example, a power transmission mechanism of a vehicle.

2. Description of the Related Art

A double-roller-type tripod constant-velocity joint (hereinafter, simply referred to as "constant-velocity joint") has been conventionally used as, for example, a drive shaft that transmits rotary driving force for vehicle travel, to vehicle wheels. A conventional constant-velocity joint includes a conventional roller unit 130 illustrated in an example in FIG. 6. As illustrated in FIG. 7A, a tripod shaft portion 11A is passed through the roller unit 130, that is, the roller unit 130 is fitted onto the tripod shaft portion 11A. In the roller unit 130, as illustrated in a sectional view in FIG. 6 in which the roller unit 130 has been assembled, an inner roller 134 is placed into an outer roller 131 from a side of the outer roller 131, on which a rib 131B is not formed. A plurality of needles 133 is disposed in an annular space formed between the outer roller 131 and the inner roller 134. A ring groove 131A is formed in an inner wall of the outer roller 131. A snap ring 135 is fitted in the ring groove 131A, so that the snap ring 135 is fitted to the outer roller 131. One end face of the outer roller 131 is provided with the rib 131B that extends radially inward and that has an annular shape. The rib 131B retains the inner roller 134 and the needles 133 so that the inner roller 134 and the needles 133 do not slip off the outer roller 131 from the one end face side. The snap ring 135 is fitted to the other end face side-portion of the outer roller 131. The inner roller 134 and the needles 133 are retained by the snap ring 135 so as not to slip off the outer roller 131 from the other end face side.

In the roller unit 130 having the above-described configuration, the diameter of a portion through which the generally spherical tripod shaft portion 11A is passed (in this case, the inside diameter of the inner roller 134) is constant in the direction of a roller rotation axis Z130. As illustrated in FIG. 7A and FIG. 7B, an outside diameter D11 of the tripod shaft portion 11A is the maximum outside diameter of the generally spherical tripod shaft portion 11A at a position near the center of the tripod shaft portion 11A. The outside diameter D11 is set slightly smaller than an inside diameter D134 of the inner roller 134. Therefore, as illustrated in FIG. 7A and FIG. 7B, it is possible to fit the roller unit 130 onto the tripod shaft portion 11A from the snap ring 135 side (see FIG. 7A), and it is also possible to fit the roller unit 130 onto the tripod shaft portion 11A from the rib 131B side (see FIG. 7B). However, the roller unit 130 is not symmetrical in shape in the direction of the roller rotation axis Z130, as illustrated in FIG. 6, FIG. 7A and FIG. 7B. The rib 131B is located on the one end face side, and the ring groove 131A and the snap ring 135 are located on the other end face side. The rib 131B is formed at such a position as to be flush with the one end face. The snap ring 135 is provided at a position that is slightly offset from the other end face toward the rib 131B in the direction of the roller rotation axis Z130. The roller unit 130 is not symmetrical in shape in the direction of the roller rotation axis Z130. As a result, there are differences in, for example, strength and performance between the case where the roller unit 130 is fitted onto the tripod shaft portion 11A from the snap ring 135 side as illustrated in FIG. 7A, and the case where the roller unit 130 is fitted onto the tripod shaft portion 11A from the rib 131B side as illustrated in FIG. 7B. In the examples illustrated in FIG. 7A and FIG. 7B, in the case where the roller unit 130 is fitted onto the tripod shaft portion 11A from the snap ring 135 side as illustrated in FIG. 7A, the snap ring 135 does not come into contact with the tripod shaft portion 11A even if the tripod shaft portion 11A is largely tilted. On the other hand, in the case where the roller unit 130 is fitted onto the tripod shaft portion 11A from the rib 131B side as illustrated in FIG. 7B, there is a possibility that the tripod shaft portion 11A and the rib 131B will come into slight contact with each other if the tripod shaft portion 11A is largely tilted. Thus, there are differences in, for example, strength and performance between these two cases.

Japanese Patent Application Publication No. 7-151158 (JP 7-151158 A) describes a double-roller-type tripod constant-velocity joint that includes an inner roller and an outer roller. According to JP 7-151158 A, a tripod shaft portion is passed through a roller unit in which the outer roller is fitted on the inner roller, from one end face side of the roller unit, on which a pressure disc is provided. Japanese Patent Application Publication No. 2008-208858 (JP 2008-208858 A) describes a tripod constant-velocity joint that includes, instead of an inner roller, a cylindrical holder having a flange that holds an outer roller. An outer member of the tripod constant-velocity joint is compact and configured such that a resin boot is easily fitted to the outer member.

In the double-roller-type tripod constant-velocity joint, the roller unit 130 illustrated in FIG. 6 is not symmetrical in shape in the direction of the roller rotation axis Z130. In the case where the tripod shaft portion 11A is passed through the roller unit 130 from the snap ring 135 side as illustrated in FIG. 7A, strength and performance are higher than those in the case where the tripod shaft portion 11A is passed through the roller unit 130 from the rib 131B side as illustrated in FIG. 7B. Therefore, a configuration that allows the tripod shaft portion 11A to be passed through the roller unit 130 only from the snap ring 135 side is required. In the related art described in JP 7-151158 A, the tripod shaft portion is passed through the roller unit in which the outer roller is fitted on the inner roller, from the one end face side on which the pressure disc is provided. With this configuration, however, the tripod shaft portion may also be passed through the roller unit from the other end face side on which no pressure disc is provided. This may cause a possibility of wrong assembly. In the related art described in JP 2008-208858 A, the tripod shaft portion may be passed through the roller unit in which the outer roller is fitted to the holder, from either end face side. This may cause a possibility of wrong assembly. Note that neither JP 7-151158 A nor JP 2008-208858 A has description regarding a configuration that allows the roller unit to be fitted to the tripod shaft portion only from a specific end face side of the roller unit.

SUMMARY OF THE INVENTION

One object of the invention is to provide a double-roller-type tripod constant-velocity joint including generally spherical tripod shaft portions and configured to prevent a worker from erroneously fit a roller unit onto the tripod shaft portion in wrong orientation.

An aspect of the invention relates to a double-roller-type tripod constant-velocity joint including: an outer ring having an inner peripheral face with three guide grooves each of which has roller guide faces that have a generally tubular shape, that face each other and that extend along an axial direction of the outer ring; a tripod member housed in the outer ring, and provided with three tripod shaft portions that are three generally spherical shaft portions that protrude into the respective guide grooves; generally cylindrical inner rollers fitted onto the respective tripod shaft portions; outer rollers fitted onto the respective inner rollers, and each disposed between the roller guide faces of a corresponding one of the guide grooves, the roller guide faces facing each other; and a plurality of rolling elements disposed in each of annular spaces formed between the inner rollers and the outer rollers. One end face of each of the outer rollers is provided with an annular rib that protrudes radially inward so as to have an inside diameter that is smaller than an outside diameter of a corresponding one of the inner rollers so that the rolling elements and the inner roller are retained in the outer roller. The other end face-side portion of each of the outer rollers is provided with an inner component retaining portion at least a portion of which has an inside diameter that is smaller than the outside diameter of a corresponding one of the inner rollers so that the rolling elements and the inner roller are retained in the outer roller. In each of roller units in each of which the inner roller and the rolling elements are retained in the outer roller by the rib and the inner component retaining portion, an inner peripheral face of the inner roller through which the tripod shaft portion is passed is provided with a tripod shaft portion insertion restricting portion that allows the tripod shaft portion to be passed through the inner roller only from an end face side of the roller unit, on which the rib of the outer roller is not provided.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
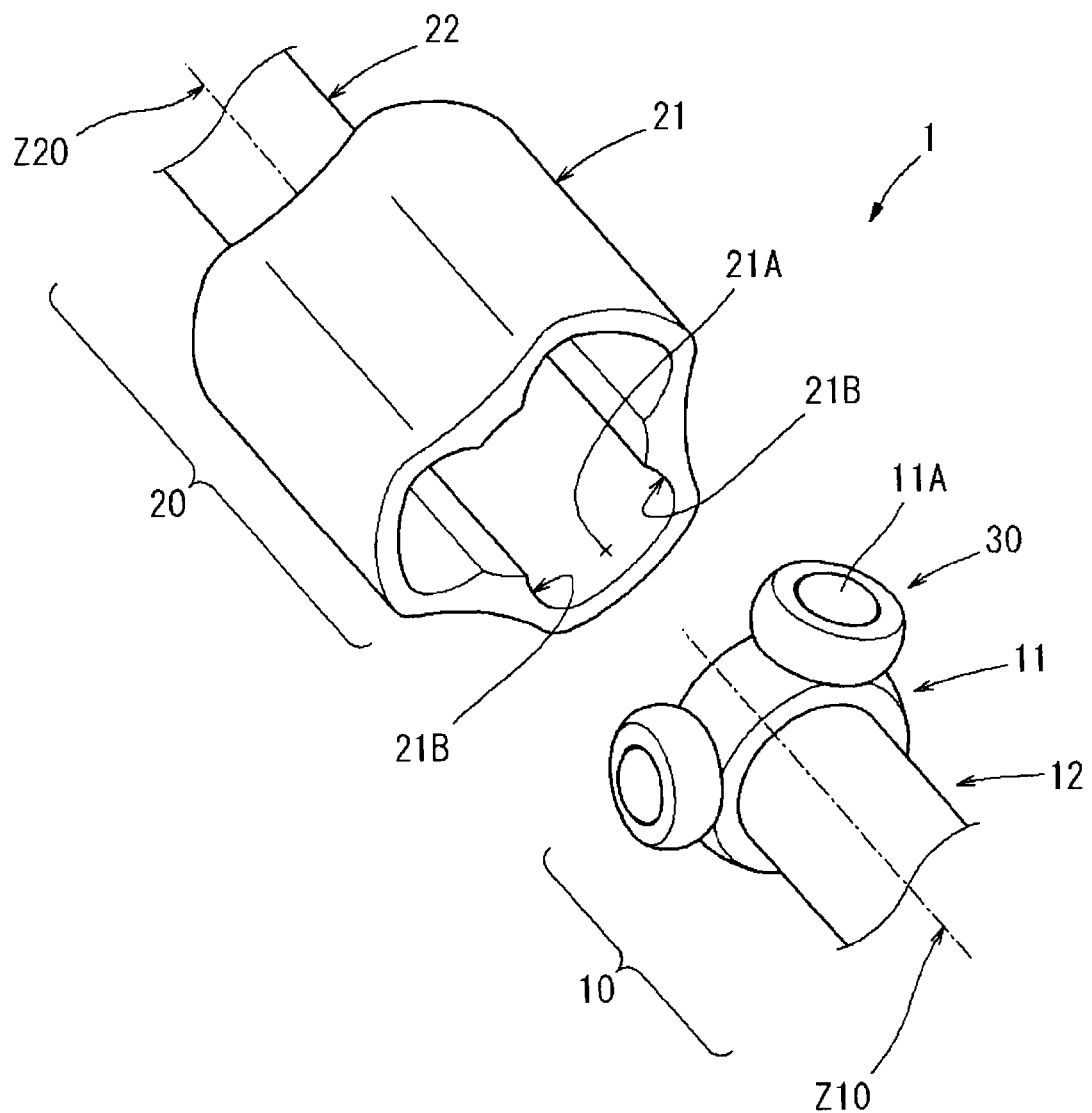
FIG. 1 is an exploded perspective view illustrating an example of the overall configuration of a double-roller-type tripod constant-velocity joint according to the invention.
Figure 2A:
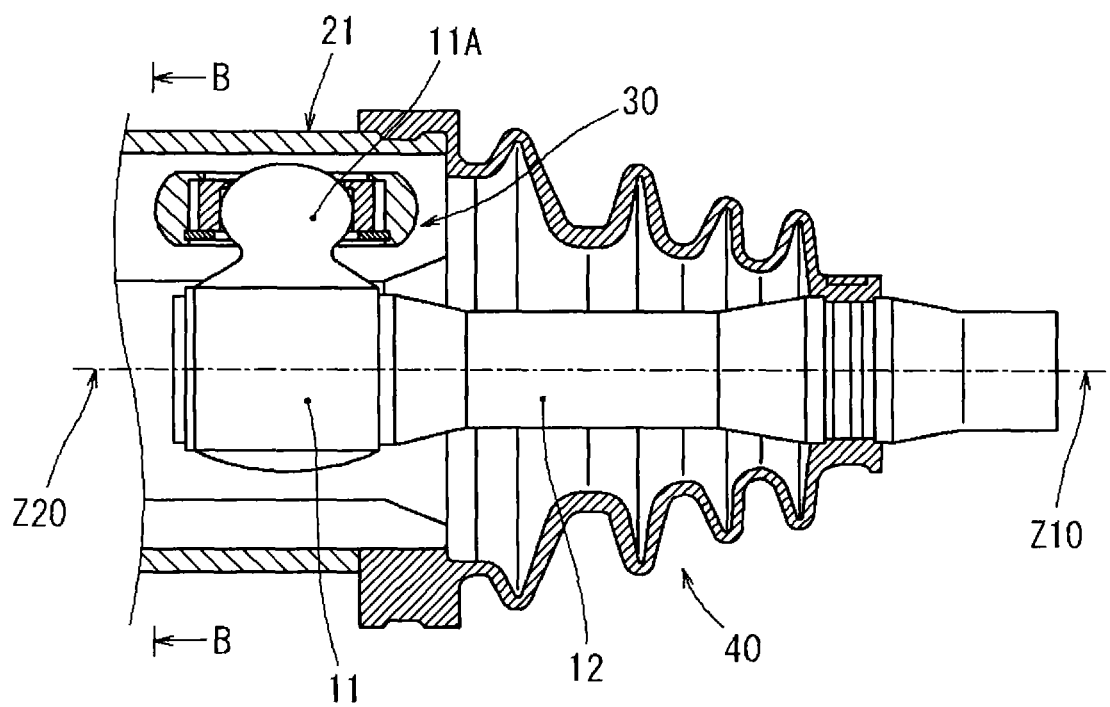
FIG. 2A is a sectional view of the double-roller-type tripod constant-velocity joint taken along its axial direction.
Figure 2B:
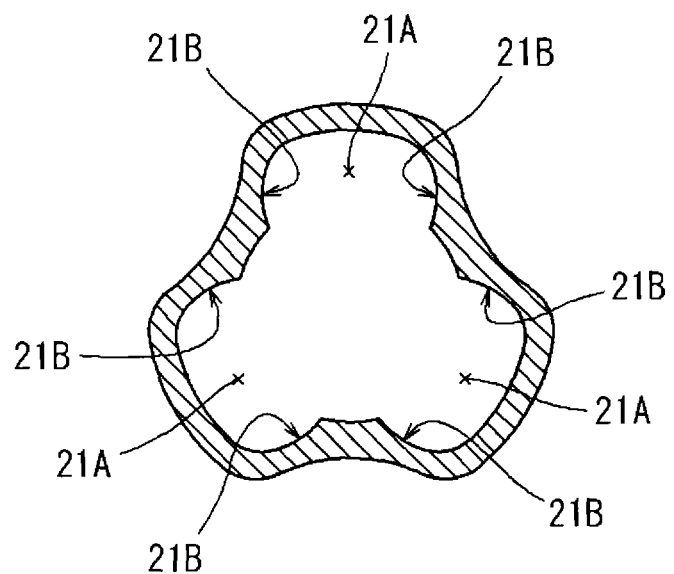
FIG. 2B is a cross-sectional view taken along the line B-B in FIG. 2A.

Hereinafter, embodiments of the invention will be described with reference to the accompanying drawings. First, with reference to FIG. 1 and FIG. 2, the overall configuration of a double-roller-type tripod constant-velocity joint 1 (hereinafter, simply referred to as "constant-velocity joint 1") will be described. FIG. 1 is an exploded perspective view of the constant-velocity joint 1. FIG. 2A is a sectional view of the constant-velocity joint 1 taken along its axial direction. FIG. 2B is a cross-sectional view taken along the line B-B in FIG. 2A. Note that, illustration of a boot 40 in FIG. 2A is omitted in FIG. 1. As illustrated in FIG. 1, the constant-velocity joint 1 includes a drive portion 20 and a passive portion 10. The drive portion 20 is a member of the constant-velocity joint 1, into which rotary driving force is input. The passive portion 10 is a member of the constant-velocity joint 1, from which the rotary driving force is output. Even when a rotation axis Z10 of the passive portion 10 does not coincide with a rotation axis Z20 of the drive portion 20 (which may function as an axis of an outer ring in the invention) and is tilted by a predetermined angle with respect to the rotation axis Z20, it is possible to always rotate the drive portion 20 and the passive portion 10 about the rotation axis Z20 and the rotation axis Z10, respectively, at a constant speed to transmit the rotary driving force. Note that, either one of the portions denoted by reference numerals 10, 20 may be a drive portion. That is, one of the two portions denoted by the reference numerals 10, 20 is a drive portion, and the other one of the two portions is a passive portion. In the present embodiment, the portion denoted by the reference numeral 20 serves as a drive portion.

The passive portion 10 includes a shaft 12 and a tripod member 11. The tripod member 11 is fixed to one end of the shaft 12. The tripod member 11 is housed in an outer ring 21. The tripod member 11 has three tripod shaft portions 11A that are three shaft portions that respectively protrude into three guide grooves 21A formed in an inner peripheral face of the outer ring 21. A roller unit 30 is fitted on each tripod shaft portion 11A. Each roller unit 30 is disposed between two roller guide faces 21B of a corresponding one of the guide grooves 21A, the roller guide faces 21B facing each other. The drive portion 20 includes the outer ring 21 and a connecting shaft 22. The connecting shaft 22 is fixed to the outer ring 21. The three guide grooves 21A each having the two roller guide faces 21B are formed in the inner peripheral face of the outer ring 21. The roller guide faces 21B of each guide groove 21A form a generally tubular shape in cooperation with a portion of the inner peripheral face of the outer ring 21 located between the roller guide faces 21B. The roller guide faces 21B of each guide groove 21A face each other, and extend along the direction of the rotation axis Z20 of the drive portion 20.

The roller units 30 are fitted on the respective tripod shaft portions 11A, and are rotatable relative to the respective tripod shaft portions 11A. Each roller unit 30 is able to move along a corresponding one of the guide grooves 21A while being rotated along the roller guide faces 21B of the guide groove 21A. As illustrated in FIG. 2A, the boot 40 is attached to an opening portion of the outer ring 21. The boot 40 prevents entry of foreign matter and water into the outer ring 21 and retains lubricating oil inside the outer ring 21. As illustrated in FIG. 2A, each tripod shaft portion 11A has a generally spherical shape. When the rotation axis Z20 and the rotation axis Z10 coincide with each other, a distal end of the generally spherical tripod shaft portion 11A passed through the roller unit 30 is protruded from the roller unit 30. FIG. 2A illustrates an example in which the distal end of the tripod shaft portion 11A is protruded from the roller unit 30. However, a configuration in which the distal end of the tripod shaft portion 11A is not protruded from the roller unit 30 may be employed. Due to the above-described configuration, when rotary driving force is input from the connecting shaft 22, each roller unit 30 contacts one of the roller guide faces 21B, which faces the rotation direction, so that rotary driving force is transmitted to the corresponding tripod member 11 and the shaft 12.

Figure 6:
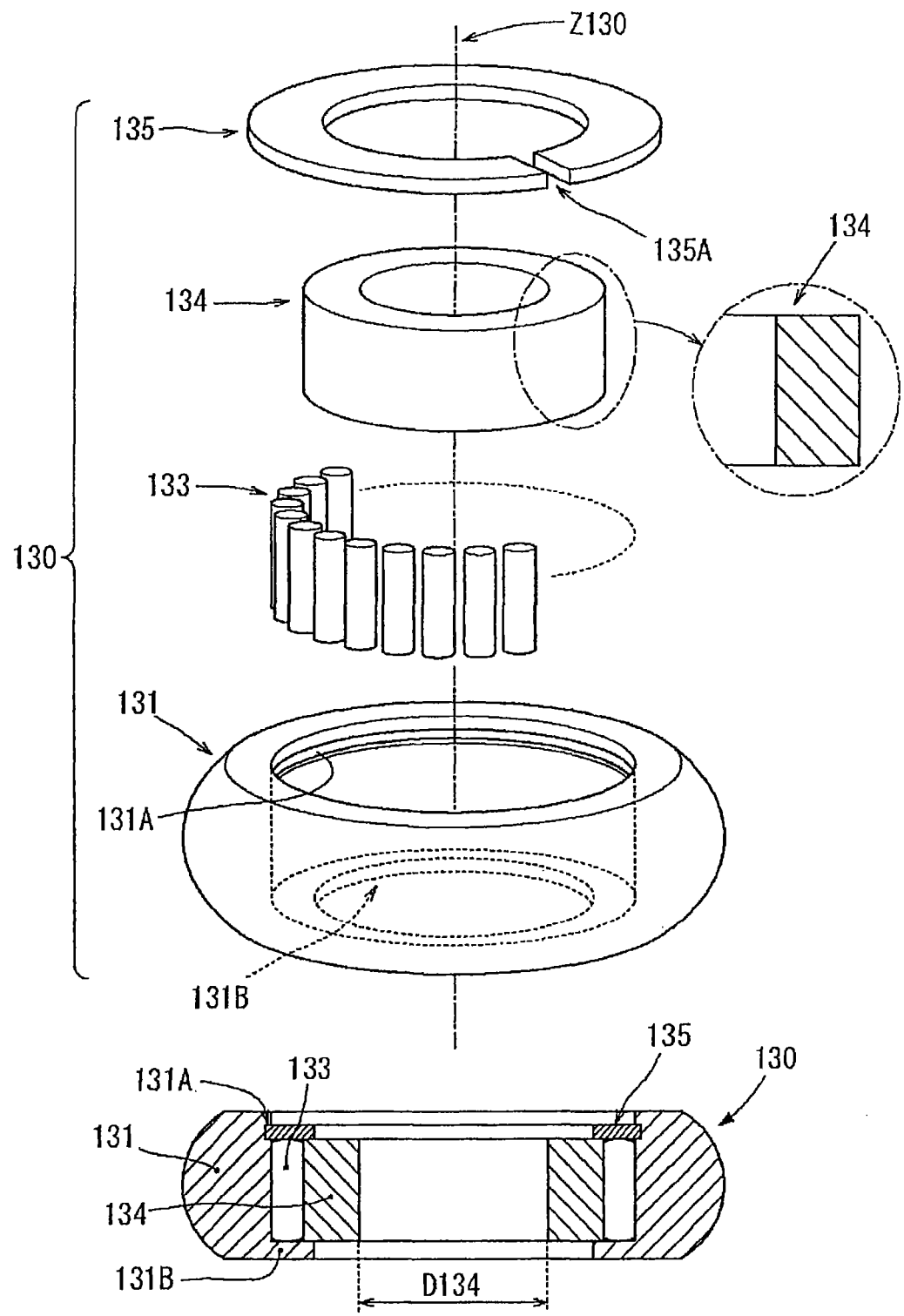
FIG. 6 illustrates an exploded perspective view of a roller unit that is fitted onto a tripod shaft portion in a conventional roller unit, and a sectional view of the roller unit in an assembled state taken along a roller rotation axis.
Figure 7A:
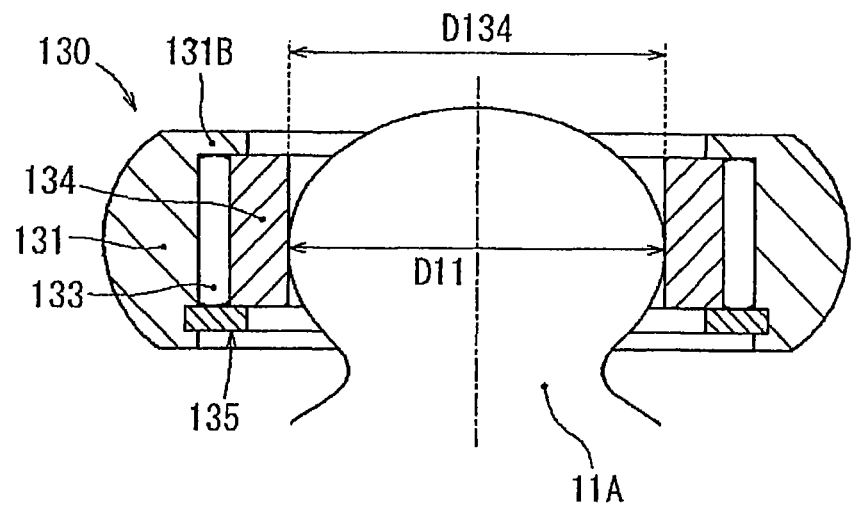
FIG. 7A is a view illustrating a state in which the tripod shaft portion is passed through the conventional roller unit from the end face side of the roller unit, on which a rib is not formed (correct side)
Figure 7B:
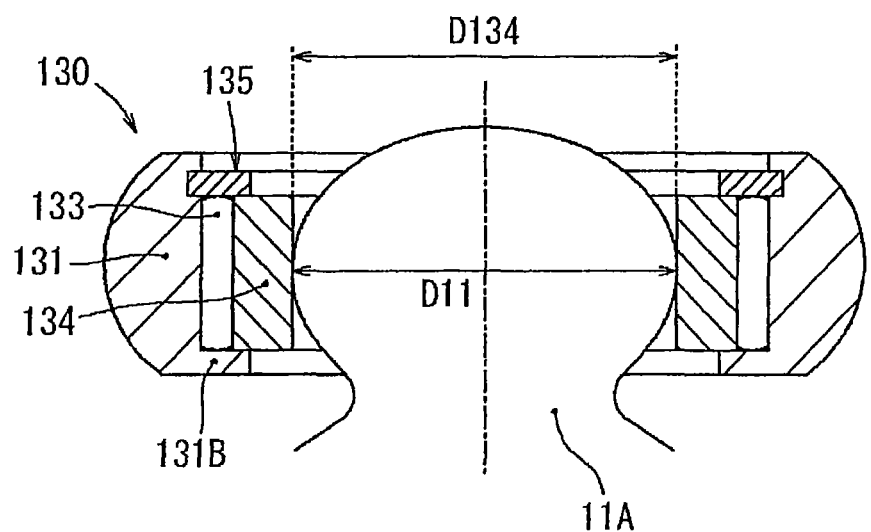
FIG. 7B is a view illustrating a state in which the tripod shaft portion is inserted into the conventional roller unit from the end face side of the roller unit, on which the rib is formed (wrong side).

As described above, in the roller unit 130 illustrated in FIG. 6, the tripod shaft portion 11A is allowed to be passed through the roller unit 130 from the snap ring 135 side (i.e., allowed to be passed through the roller unit 130 in a desirable direction) as illustrated in FIG. 7A. However, as illustrated in FIG. 7B, the tripod shaft portion 11A is also allowed to be passed through the roller unit 130 from the rib 131B side (i.e., allowed to be passed through the roller unit 130 in an undesirable direction). As described above, the roller unit 130 is not symmetrical in shape in the direction of the roller rotation axis Z130. As a result, there are differences in, for example, strength and performance between the state illustrated in FIG. 7A and the state illustrated in FIG. 7B. It has been confirmed that, in the case where the tripod shaft portion 11A is passed through the roller unit 130 from the snap ring 135 side as illustrated in FIG. 7A, the strength and performance are both higher than those in the case where the tripod shaft portion 11A is passed through the roller unit 130 from the rib 131B side as illustrated in FIG. 7B. Therefore, when performing a work of fitting the roller unit 130 onto the tripod shaft portion 11A, a worker needs to perform the work carefully so as not to fit the roller unit 130 onto the tripod shaft portion 11A in wrong orientation. However, there still is a possibility that the worker will erroneously fit the roller unit 130 onto the tripod shaft portion 11A in wrong orientation. Therefore, in the following embodiment of the invention, for example, the configuration of a double-roller-type tripod constant-velocity joint, which prevents a worker from erroneously fitting a roller unit onto a tripod shaft portion in wrong orientation, will be described.

Figure 3:
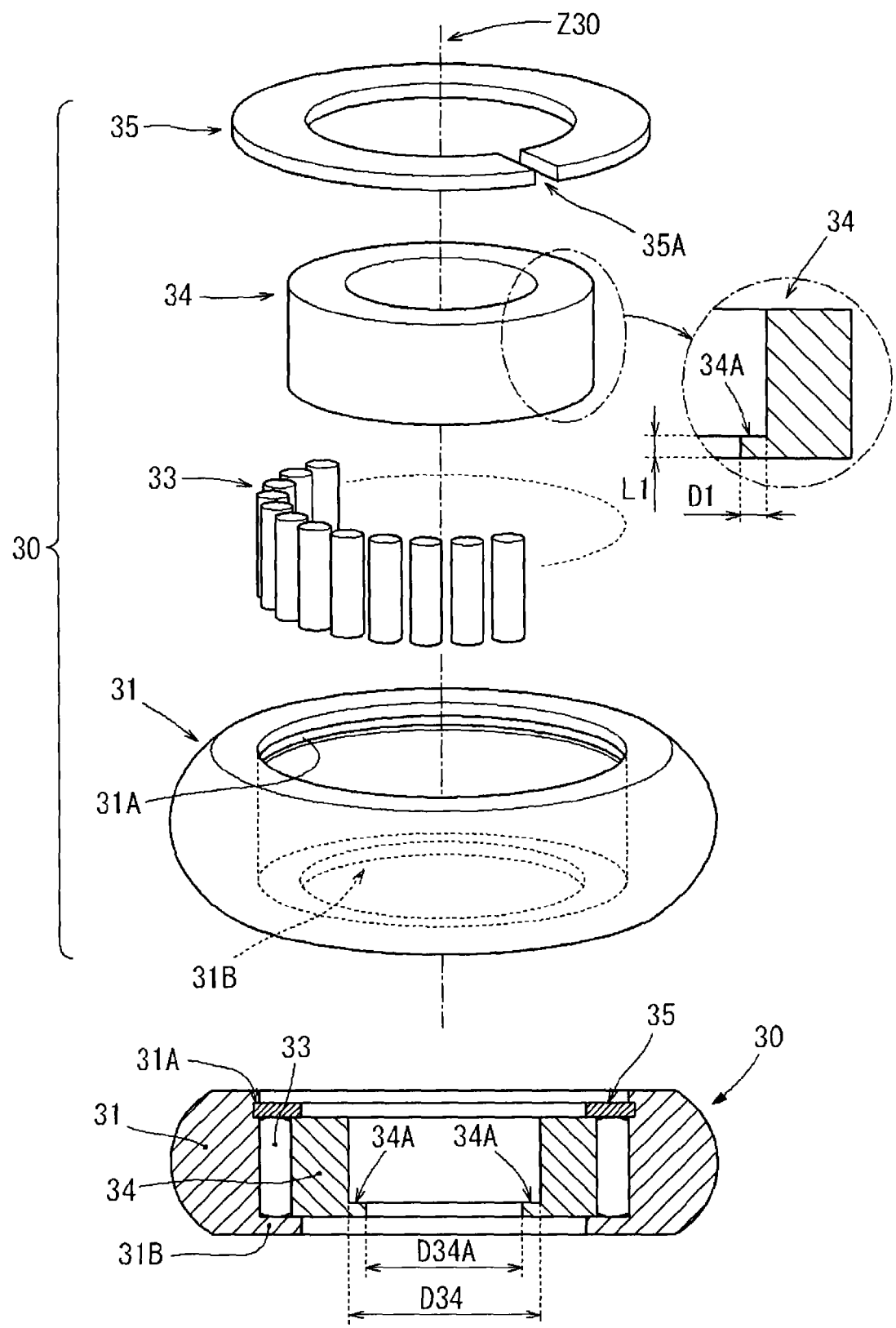
FIG. 3 illustrates an exploded perspective view of a roller unit that is fitted onto a tripod shaft portion in an embodiment of the invention, and a sectional view of a roller unit in an assembled state taken along a roller rotation axis.

Next, with reference to FIG. 3 and FIG. 4, the configuration of the roller unit 30 in the present embodiment, the state (FIG. 4A) in which the tripod shaft portion 11A is passed through the roller unit 30 in a desirable direction (correct direction), and the state (FIG. 4B) in which the tripod shaft portion 11A is inserted into the roller unit 30 in an undesirable direction (incorrect direction) will be described. FIG. 3 illustrates an exploded perspective view of the roller unit 30, and a sectional view of the roller unit 30 in an assembled state taken along a roller rotation axis Z30.

As illustrated in FIG. 3, the roller unit 30 includes an outer roller 31, a plurality of needles 33 (which may function as rolling elements in the invention), an inner roller 34, and a snap ring 35 (which may function as an inner component retaining portion in the invention). The outer roller 31 is a member having a cylindrical inner peripheral face and an outer peripheral face that is convex in the axial direction such that the outside diameter of the outer roller 31 is largest at the axial center thereof. One end face of the outer roller 31 is provided with a rib 31B that protrudes radially inward and that extends in the circumferential direction. The inside diameter of the rib 31B is set smaller than the outside diameter of the inner roller 34. Due to this configuration, the inner roller 34 and the needles 33 disposed within the outer roller 31 are retained so as not to slip off the rib 31B-side end face of the outer roller 31. The other end face side portion of an inner wall of the outer roller 31 (a portion closer to the end face on the opposite side of the outer roller 31 from the rib 31B) has a ring groove 31A which extends in the circumferential direction and into which the snap ring 35 is fitted. The snap ring 35 is formed of an elastic body, and has, for example, a cutout 35A so that the outside diameter of the snap ring 35 is adjustable. The needles 33 are needle rollers, and reduce the rotational resistance of the outer roller 31 with respect to the inner roller 34. The material of the needles 33 is higher in hardness than the material of the outer roller 31. Note that, the needle rollers (needles 33), the outer roller 31 and the snap ring 35 are substantially the same as the needle rollers (needles 133), the outer roller 131 and the snap ring 135 of the conventional roller unit 130 illustrated in FIG. 6. That is, the configuration of the inner roller 34 of the roller unit 30 is different from that of the inner roller 134 of the roller unit 130.

The inner roller 34 is cylindrical, and an inside diameter D34, which is the diameter of the inner peripheral face, is set to such a diameter that the inner roller 34 is allowed to be fitted onto the generally spherical tripod shaft portion 11A (a diameter slightly larger than a maximum outside diameter D11 of the tripod shaft portion 11A at a position near the center thereof (see FIG. 4A and FIG. 4B)). The material of the inner roller 34 is substantially the same as the material of the outer roller 31. As illustrated in FIG. 3, an end portion of the inner peripheral face of the inner roller 34, the end portion being on the rib 31B side in the direction of the roller rotation axis Z30, is provided with an inner roller inwardly protruding portion 34A. The inner roller inwardly protruding portion 34A protrudes radially inward as to have an inside diameter D34A that is smaller than the outside diameter D11 (see FIG. 4A and FIG. 4B) of the generally spherical tripod shaft portion measured at a position near the axial center thereof. The inner roller inwardly protruding portion 34A may be a continuous protrusion (see FIG. 5A) or may be non-continuous (see FIG. 5B to FIG. 5D). When the inner roller inwardly protruding portion 34A is non-continuous, configurations other than the examples illustrated in FIG. 5B to FIG. 5D may be employed.

Figure 4A:
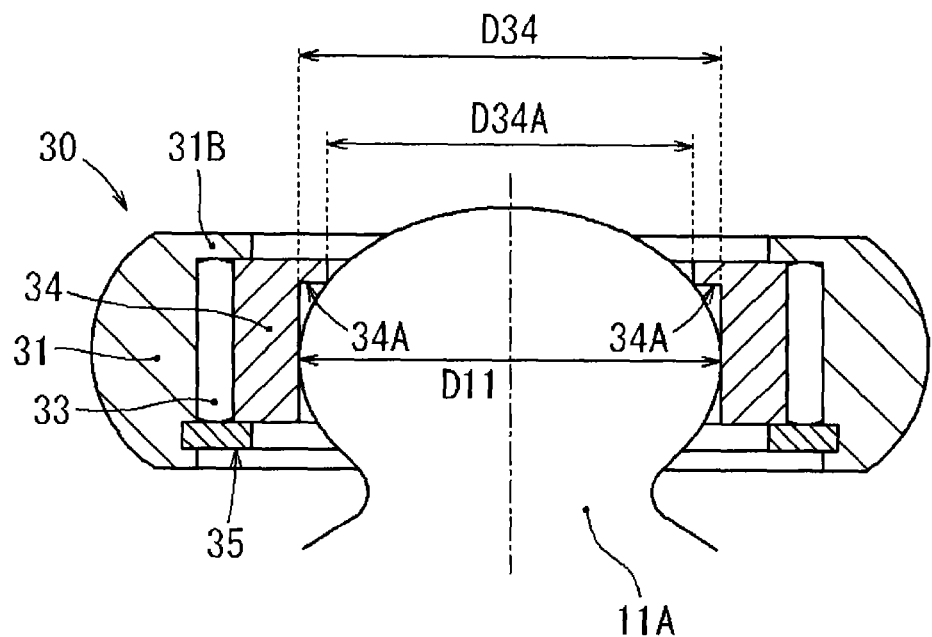
FIG. 4A is a view illustrating a state in which the tripod shaft portion is passed through the roller unit in the embodiment from the end face side of the roller unit, on which a rib is not formed (correct side)
Figure 4B:
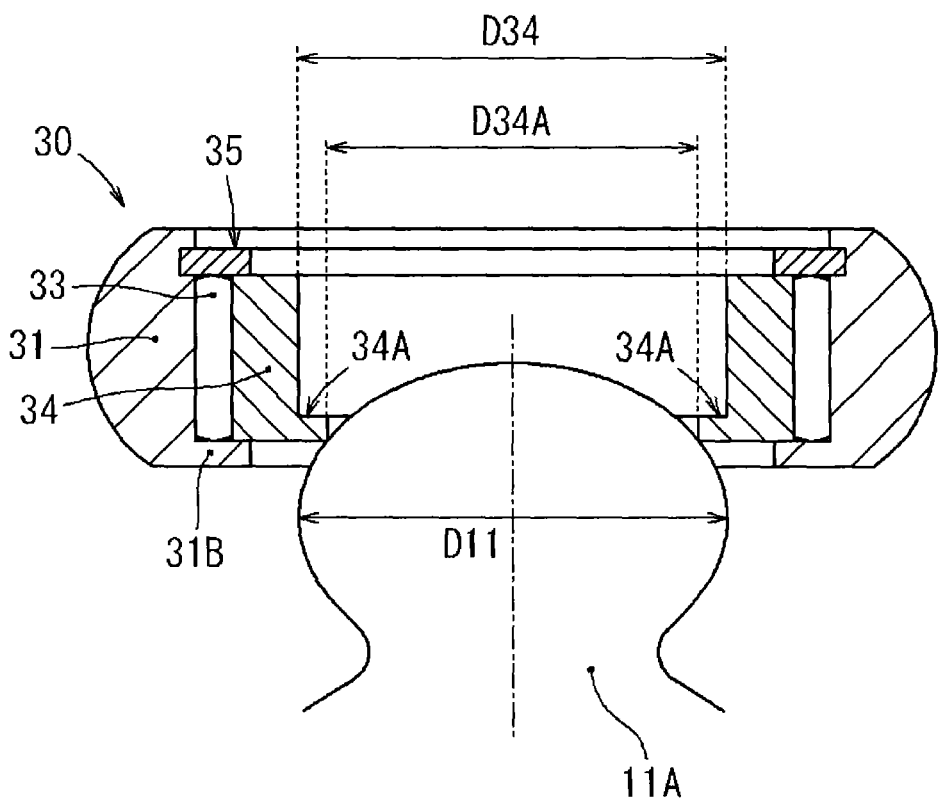
FIG. 4B is a view illustrating a state in which the tripod shaft portion is inserted into the roller unit in the embodiment from the end face side of the roller unit, on which the rib is formed (wrong side)
Figure 5A:
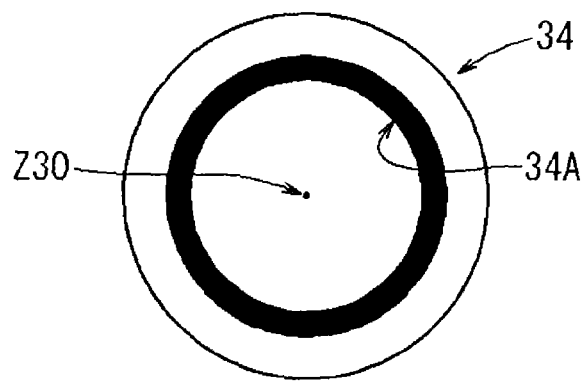
FIG. 5A is a view illustrating an example in which an inner roller inwardly protruding portion formed on an inner peripheral face of an inner roller is continuous.
Figure 5B:
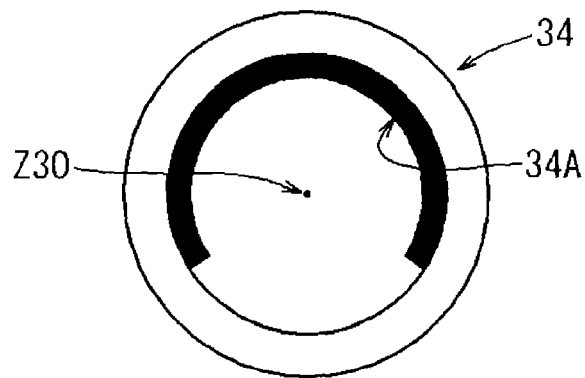
FIG. 5B to FIG. 5D are views each illustrating an example in which the inner roller inwardly protruding portion formed on the inner peripheral face of the inner roller is non-continuous.
Figure 5C:
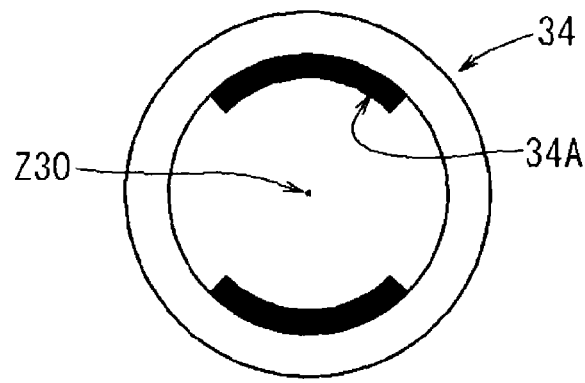
Figure 5D:
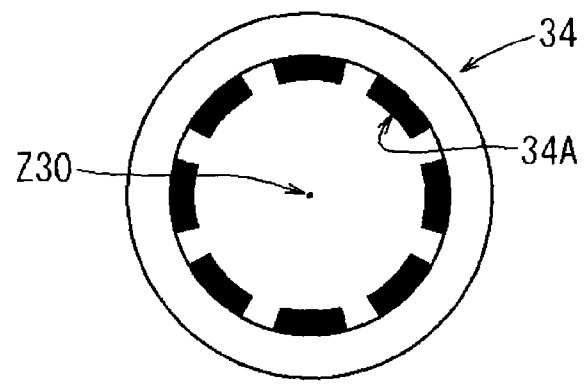

A radial protrusion length D1 and an axial protrusion length L1 of the inner roller inwardly protruding portion 34A are set to such appropriate values that, for example, in the state illustrated in FIG. 4A, the amount of protrusion of the distal end of the tripod shaft portion 11A from the roller unit 30 is a desired amount. For example, the radial protrusion length D1 is set to a length that is greater than an elastic-range length that is such a radial length that, if the tripod shaft portion 11A is forcibly press-fitted (by a press-fitting device or the like) into the roller unit 30 from the end face side thereof where the inner roller inwardly protruding portion 34A is provided, the inner roller inwardly protruding portion 34A is able to elastically deform without breaking or plastically deforming and then return to its original shape. Furthermore, the radial protrusion length D1 is set to a plastic-range length that is such a radial length that, if the tripod shaft portion 11A is forcibly press-fitted (by a press-fitting device or the like) into the roller unit 30 from the end face side thereof where the inner roller inwardly protruding portion 34A is provided, the inner roller inwardly protruding portion 34A breaks or plastically deforms. Thus, setting is made such that the inside diameter D34 of the inner roller 34 (the inside diameter of a portion of the inner roller 34 other than the inner roller inwardly protruding portion 34A)>the outside diameter D11 of the tripod shaft portion 11A (the maximum outside diameter of the tripod shaft portion 11A at a position near the axial center thereof)>the inside diameter D34A of the inner roller inwardly protruding portion 34A. Note that, the inner roller inwardly protruding portion 34A may function as a tripod shaft portion insertion restricting portion in the invention.

When the roller unit 30 is assembled, first, grease is applied to the inner peripheral face of the outer roller 31, and the needles 33 are placed along the inner wall of the outer roller 31 (the needles 33 are retained by the grease) from the end face side of the outer roller 31 where the ring groove 31A is formed (in the present embodiment, from the other end face side). Then, the inner roller 34 is placed into the outer roller 31 from the end face side of the outer roller 31 where the ring groove 31A is formed. Then, the snap ring 35 is fitted into the ring groove 31A of the outer roller 31, so that the roller unit 30 is assembled. Then, the assembled roller unit 30 is fitted onto the tripod shaft portion 11A, so that the passive portion 10 (see FIG. 1 and FIG. 2A) is completed.

FIG. 4A illustrates a state in which the tripod shaft portion 11A is passed through the roller unit 30 from the snap ring 35 side (from the correct side) of the roller unit 30. In this case, the inner roller inwardly protruding portion 34A does not come into contact with the tripod shaft portion 11A until the distal end of the tripod shaft portion 11A protrudes from the roller unit 30 (or until the distal end of the tripod shaft portion 11A reaches a position near the rib 31B-side end face of the roller unit 30). Thus, a worker is able to fit the roller unit 30 onto the tripod shaft portion 11A in the correct direction. On the other hand, FIG. 4B illustrates a state in which the tripod shaft portion 11A is inserted into the roller unit 30 from the rib 31B side (from the incorrect side) of the roller unit 30. In this case, the inner roller inwardly protruding portion 34A comes into contact with the tripod shaft portion 11A before the tripod shaft portion 11A is housed within the roller unit 30. Thus, a worker is not able to fit the roller unit 30 onto the tripod shaft portion 11A. Thus, according to the present embodiment, a worker is prevented from erroneously fitting the roller unit 30 onto the tripod shaft portion 11A in wrong orientation (if the orientation of the roller unit 30 is wrong, the roller unit 30 cannot be fitted onto the tripod shaft portion 11A).

In the constant-velocity joint 1 according to the above-described embodiment, the tripod shaft portion 11A is allowed to be passed through the roller unit 30 only from the inner component retaining portion side (the snap ring 35 side) of the roller unit 30. Thus, it is possible to appropriately prevent a worker from erroneously fitting the roller unit 30 onto the tripod shaft portion 11A in wrong orientation. Furthermore, the inner roller inwardly protruding portion 34A, which is an example of the tripod shaft portion insertion restricting portion, has a considerably simple configuration, and therefore is achieved easily without increasing the number of components.

The configurations, structures, appearances, shapes, etc., of the various members that constitute the double-roller-type tripod constant-velocity joint 1 and the roller unit 30 according to the invention may be modified within the scope of the invention. In the embodiment described above, the needles are used as the rolling elements. However, the rolling elements are not limited to needles, and other various rolling elements, such as steel balls or the like, may be used. Note that, the shape of the inner component retaining portion (the snap ring) is not particularly limited, as long as at least a portion of the inner component retaining portion has an inside diameter that is smaller than the outside diameter of the inner roller. In the above-description, "greater (larger) than or equal to ($\geq$)" and "smaller than or equal to ($\leq$)" may be replaced with "greater (larger) than (>)" and "smaller than (<)", respectively, and "greater (larger) (>)" and "smaller than (<)" may be replaced with "greater (larger) than or equal to ($\geq$)" and "smaller than or equal to ($\leq$)", respectively.

What is claimed is:

1. A double-roller-type tripod constant-velocity joint comprising:
    an outer ring having an inner peripheral face with three guide grooves each of which has roller guide faces that form a generally tubular shape in cooperation with a portion of the inner peripheral face of the outer ring located between the roller guide faces, the roller guide faces facing each other and extending along an axial direction of the outer ring;
    a tripod member housed in the outer ring, and provided with three tripod shaft portions that are three generally spherical shaft portions that protrude into the respective guide grooves;
    generally cylindrical inner rollers fitted onto the respective tripod shaft portions;
    outer rollers fitted onto the respective inner rollers, and each disposed between the roller guide faces of a corresponding one of the guide grooves, the roller guide faces facing each other; and
    a plurality of rolling elements disposed in each of annular spaces formed between the inner rollers and the outer rollers, wherein
    one end face of each of the outer rollers is provided with an annular rib that protrudes radially inward so as to have an inside diameter that is smaller than an outside diameter of a corresponding one of the inner rollers so that the rolling elements and the inner roller are retained in the outer roller,
    the other end face-side portion of each of the outer rollers is provided with an inner component retaining portion at least a portion of which has an inside diameter that is smaller than the outside diameter of a corresponding one of the inner rollers so that the rolling elements and the inner roller are retained in the outer roller, and
    in each of roller units in each of which the inner roller and the rolling elements are retained in the outer roller by the rib and the inner component retaining portion, an inner peripheral face of the inner roller through which the tripod shaft portion is passed is provided with a tripod shaft portion insertion restricting portion that allows the tripod shaft portion to be passed through the inner roller only from an end face side of the roller unit, on which the rib of the outer roller is not provide,
    wherein the tripod shaft portion insertion restricting portion is an inner roller inwardly protruding portion formed on the inner peripheral face of the inner roller at a position near an end face of the inner roller, the end face being close to the rib, the inner roller inwardly protruding portion being continuous or non-continuous in a circumferential direction of the inner roller and having an inside diameter smaller than a maximum outside diameter of the tripod shaft portion measured on a cross-section taken along a direction orthogonal to the tripod shaft portion, and wherein a radially inward protrusion length of the inner roller inwardly protruding portion is greater than an elastic-range length that is such a length that, if the tripod shaft portion is forcibly press-fitted into the roller unit from an end face side of the roller unit where the inner roller inwardly protruding portion is provided, the inner roller inwardly protruding portion is able to elastically deform without breaking or plastically deforming and then return to an original shape, and is set to a plastic-range length that is such a length that, if the tripod shaft portion is forcibly press-fitted into the roller unit from the end face side of the roller unit where the inner roller inwardly protruding portion is provided, the inner roller inwardly protruding portion breaks or plastically deforms.

* * * * *